(12) United States Patent
Jaldén et al.

(10) Patent No.: US 12,538,369 B2
(45) Date of Patent: Jan. 27, 2026

(54) NETWORK NODE AND METHOD FOR SIMULTANEOUS TRANSMISSIONS IN A WIRELESS COMMUNICATIONS NETWORK

(71) Applicant: Telefonaktiebolaget LM Ericsson (publ), Stockholm (SE)

(72) Inventors: Niklas Jaldén, Enköping (SE); Anders Furuskär, Stockholm (SE); Hans Hannu, Luleå (SE); Niklas Wernersson, Kungsängen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 467 days.

(21) Appl. No.: 18/011,565

(22) PCT Filed: Jun. 25, 2020

(86) PCT No.: PCT/SE2020/050667
§ 371 (c)(1),
(2) Date: Dec. 20, 2022

(87) PCT Pub. No.: WO2021/262056
PCT Pub. Date: Dec. 30, 2021

(65) Prior Publication Data
US 2023/0232478 A1 Jul. 20, 2023

(51) Int. Cl.
*H04W 76/15* (2018.01)
*H04W 72/121* (2023.01)

(52) U.S. Cl.
CPC ......... *H04W 76/15* (2018.02); *H04W 72/121* (2013.01)

(58) Field of Classification Search
None
See application file for complete search history.

(56) References Cited

U.S. PATENT DOCUMENTS 6,330,460 B1 12/2001 Wong et al.
2003/0128658 A1 7/2003 Walton et al.

FOREIGN PATENT DOCUMENTS

WO WO-2011063052 A2 * 5/2011 ............. H04J 13/20
WO 2013074830 A1 5/2013

OTHER PUBLICATIONS

International Search Report and Written Opinion for International Patent Application No. PCT/SE2020/050667, mailed Mar. 11, 2021, 11 pages.

* cited by examiner

*Primary Examiner* — Kouroush Mohebbi
(74) *Attorney, Agent, or Firm* — Withrow & Terranova, PLLC

(57) ABSTRACT

A method performed by a network node for handling data transmissions to two or more User Equipments, UEs, in a wireless communications network is provided. The network node decides that a first UE and a second UE are compatible for simultaneous data transmissions. The network node times the data transmissions to the first UE and the second UE in a common time resource, for simultaneous data transmissions comprising a first data transmission to the first UE and a second data transmission the second UE.

14 Claims, 12 Drawing Sheets

---

401. Deciding that a first UE and a second UE are compatible for simultaneous data transmissions 402. Determining that each of the first UE and the second UE has predictive requirement for data 403. Timing the data transmissions to the first UE and the second UE in a common time resource, for simultaneous data transmissions comprising a first data transmission to the first UE and a second data transmission the second UE 401. Deciding that a first UE and a second UE are compatible for simultaneous data transmissions

402. Determining that each of the first UE and the second UE has predictive requirement for data

403. Timing the data transmissions to the first UE and the second UE in a common time resource, for simultaneous data transmissions comprising a first data transmission to the first UE and a second data transmission the second UE

Fig. 4

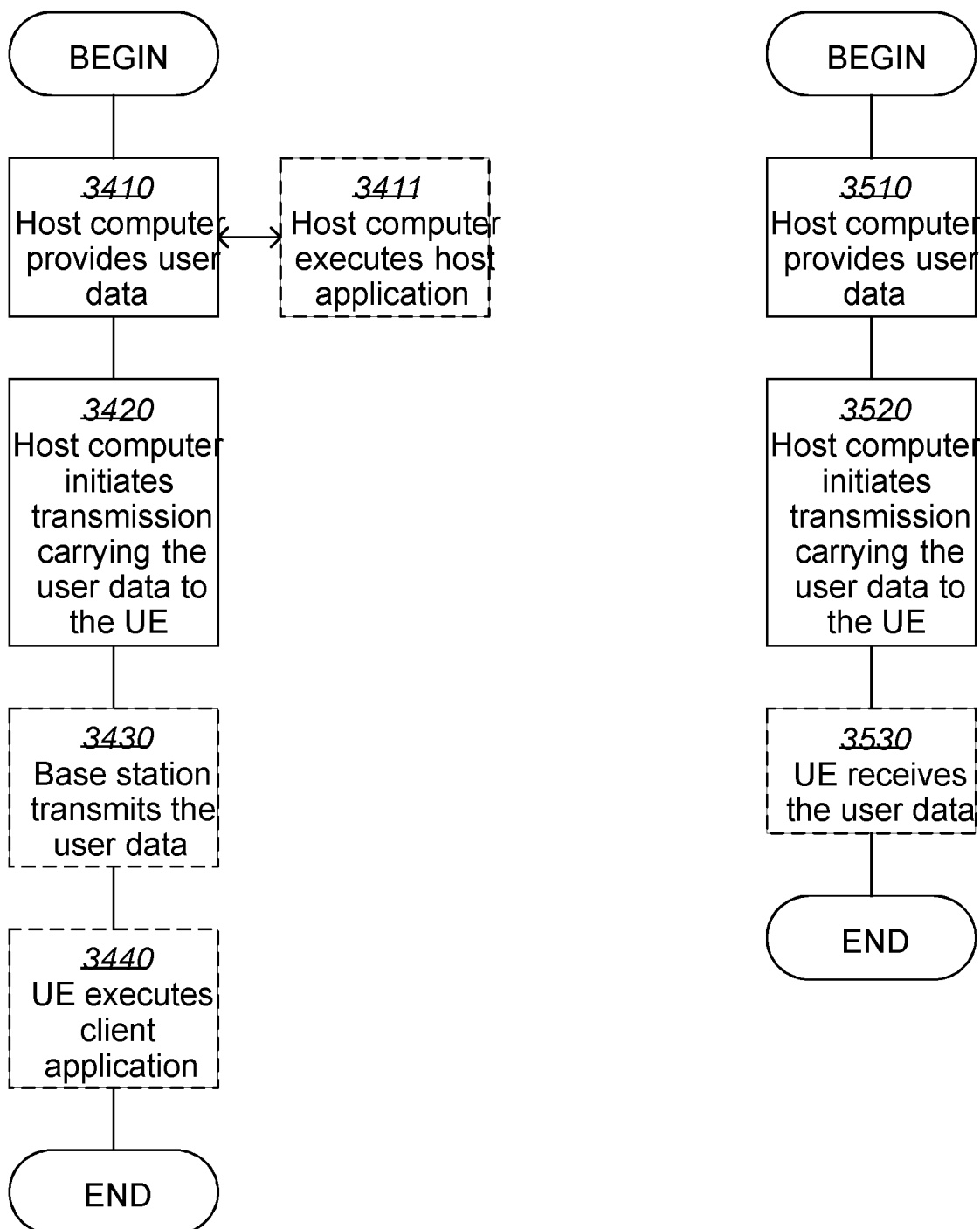

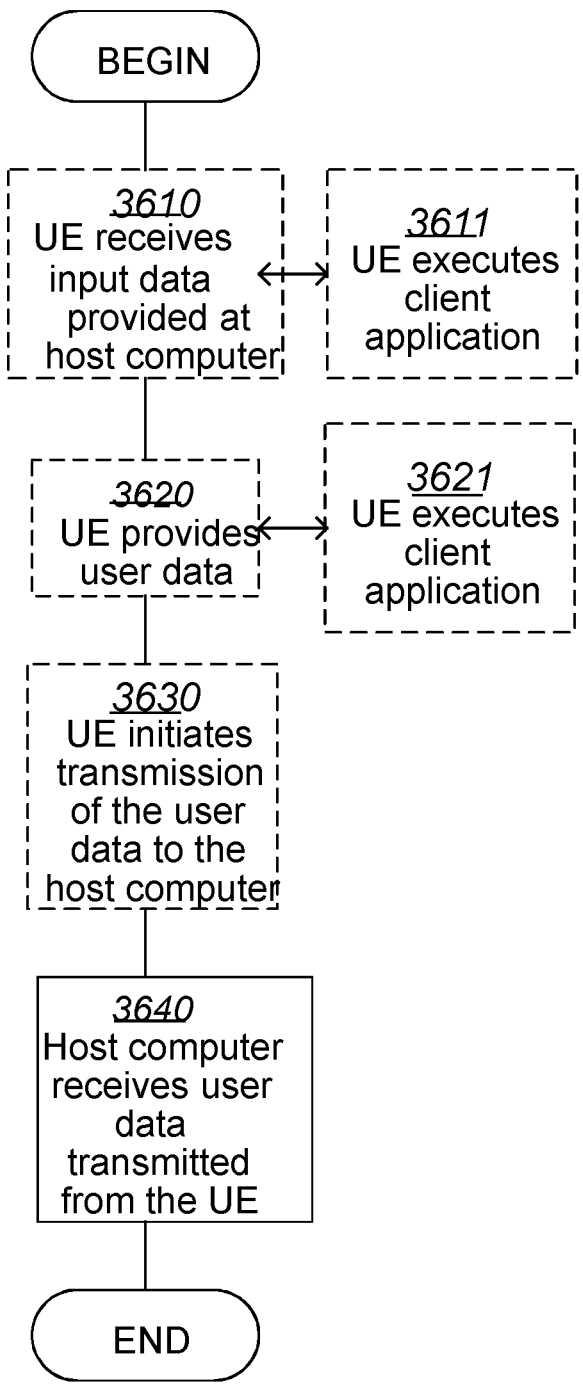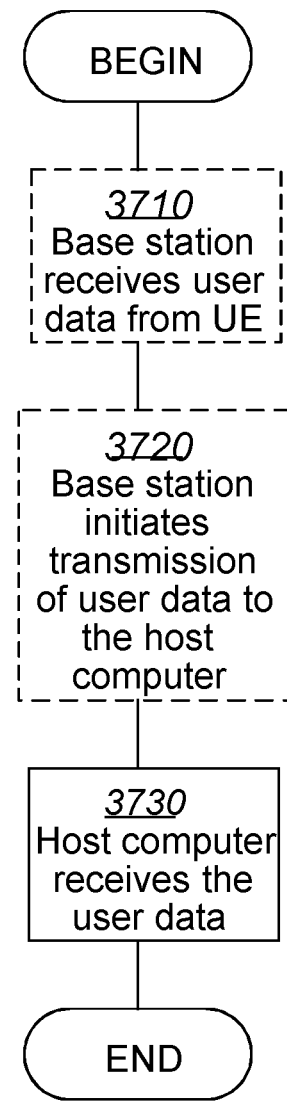
FIG 13
FIG 14

NETWORK NODE AND METHOD FOR SIMULTANEOUS TRANSMISSIONS IN A WIRELESS COMMUNICATIONS NETWORK

This application is a 35 U.S.C. § 371 national phase filing of International Application No. PCT/SE2020/050667, filed Jun. 25, 2020, the disclosure of which is incorporated herein by reference in its entirety.

TECHNICAL FIELD

Embodiments herein relate to a network node and a method performed therein. In some aspects, they relate to handling data transmissions to two or more User Equipments (UEs) in a wireless communications network.

BACKGROUND

In a typical wireless communication network, wireless devices, also known as wireless communication devices, mobile stations, stations (STA) and/or User Equipment (UE), communicate via a Local Area Network such as a W-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a W-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR) or Next Generation (NG). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Advanced Antenna Systems (AAS) may be used to significantly enhance performance of wireless communication systems in both Uplink (UL) and Downlink (DL). In short, advanced antennas such as AAS, provide a possibility to utilize a spatial domain of a channel to improve quality and reliability of transmissions, by directing the radiated energy in space, commonly called beamforming.

NR is currently being deployed worldwide using AAS. However, the AASs are consuming much more power than regular non-AAS products.

SUMMARY

An object of embodiments herein is to improve the performance in a wireless communications network using simultaneous data transmissions.

According to an aspect, the object is achieved by a method performed by a network node for handling data transmissions to two or more User Equipments, UEs, in a wireless communications network. The network node decides that a first UE and a second UE are compatible for simultaneous data transmissions. The network node times the data transmissions to the first UE and the second UE in a common time resource, for simultaneous data transmissions comprising a first data transmission to the first UE and a second data transmission the second UE.

According to another aspect, the object is achieved by a network node configured to handle data transmissions to two or more User Equipments, UEs, in a wireless communications network. The network node further being configured to:

Decide that a first UE and a second UE are compatible for simultaneous data transmissions, and time the data transmissions to the first UE and the second UE in a common time resource, for simultaneous data transmissions comprising a first data transmission to the first UE and a second data transmission the second UE.

BRIEF DESCRIPTION OF THE DRAWINGS

FIG. 4 is a flow chart depicting embodiments of a method in a network node.
FIGS. 11 to 14 are flowcharts illustrating methods implemented in a communication system including a host computer, a base station and a user equipment.

DETAILED DESCRIPTION

Figure 1:
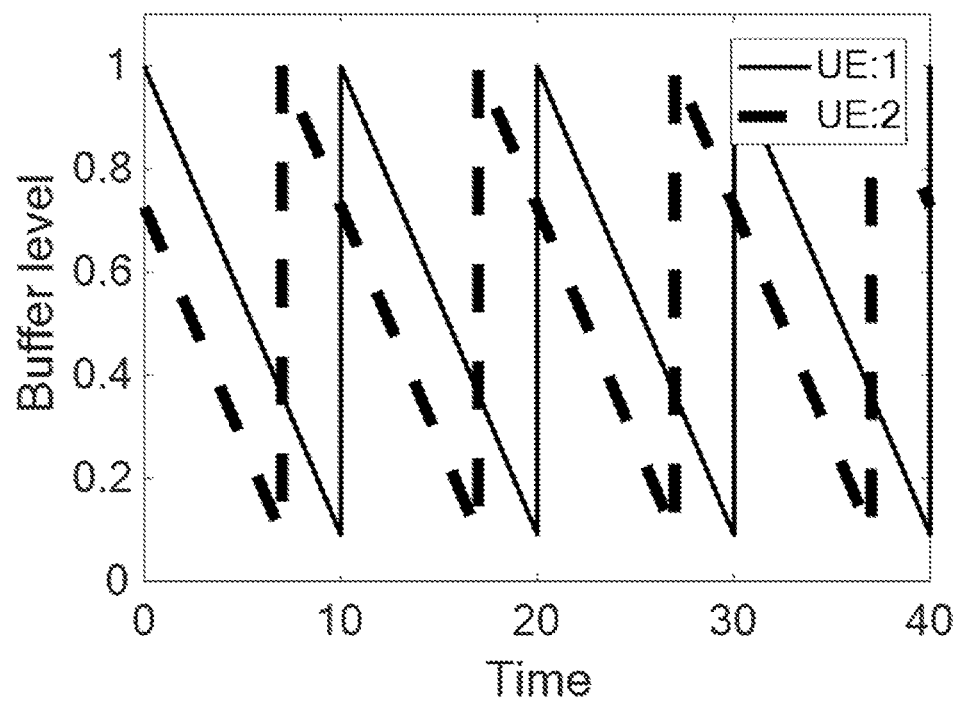
FIG. 1 is a schematic diagram illustrating prior art.

As a part of developing embodiments herein the inventors identified a problem with prior art which first will be discussed.

Directing the emissions in space allows for scheduling two, or more, UEs simultaneously using the same time and frequency resources, so called Multiple User (MU)-MIMO. More efficient reuse of resources increases the overall capacity in the wireless communications networks which will be needed as the demand for data increases, and the spectrum is a scarce necessity.

More efficient use of resources will also allow for serving UEs more quickly, hence providing more idle time for the gNBs, which in turn allows for more sleep-time for a gNB and hence a decrease in the energy consumption. This in turn decreases heat dissipation needs for the radios in the gNBs which would result in smaller and cheaper products. One pre-requisite to achieve benefits with MU-MIMO, is that there are more than one UE requesting data at the same time.

Some of the most data demanding services in today's networks are however not real-time demanding. As examples, consider video streaming services like YouTube, Netflix etc. To ensure smooth viewing experience, the quality of the video is adapted to the transport link capacity. Further, video data is buffered at the receiver, where the buffer may span several, e.g. 60, seconds of video. New video data is almost periodically requested to maintain a steady level of the play-out buffer level. This provides a relatively predictive pattern at the terminal of how much data is needed and when.

Similar predictive patterns may be seen in music streaming and large file downloads.

NR is currently being deployed worldwide using AAS. The AASs are consuming much more power than regular non-AAS products, and energy-saving schemes are hence currently attracting a lot of research. The most promising energy saving schemes of today are to put the whole or parts of an AAS to sleep when there is no data to transmit. However, methods to impact the data transmission needs at the gNB to increase sleep occasions is missing. Thus, methods that may increase sleep durations for the radios are needed.

Current AAS products are quite large and heavy which increases both cost and ease of deployment. One of the main aspects driving size and weight in our current products are the heat sinking fins. The majority of the heat is generated by the power amplifiers and is hence directly coupled by the resource utilization at the gNB. The ASICs are however the most heat sensitive components and strict requirements are put on maximum tolerable heat before back-off schemes begins to limit the resource utilization. One of these back-off methods currently being developed in some products is a scheduling algorithm. The scheduling algorithm limits the number of PRBs that are allowed to be scheduled to limit the heat generation in gNB. Given a limited amount of PRBs that may be used for transmission, there are a number of additional features that tries to organize data such make best use of the limited resources. One such core part of that algorithm is to delay certain transmissions on a small time scale level to still manage transmissions while not transmitting as often. The scheduling algorithm does however not impact the data flow to the gNB nor the data request timing form the UEs.

Several measurements as well as simulations of networks indicate that the current traffic distribution and traffic patterns is what limits the number of users requesting data at the same time and thus being scheduled using MU transmission, and not the gNBs ability to spatially multiplex them. Hence, methods for increasing the number of UEs simultaneously requesting data would increase the level of spatial multiplexing, which would make more efficient use of the resources in the network, i.e. delivering the same level of requested data while allowing for more sleep occasions.

FIG. 1 depicts a schematic image of the percentage of data left in the playout buffer for two UEs, UE1 and UE2, in a network streaming video of similar quality and same buffer size.

Figure 2:
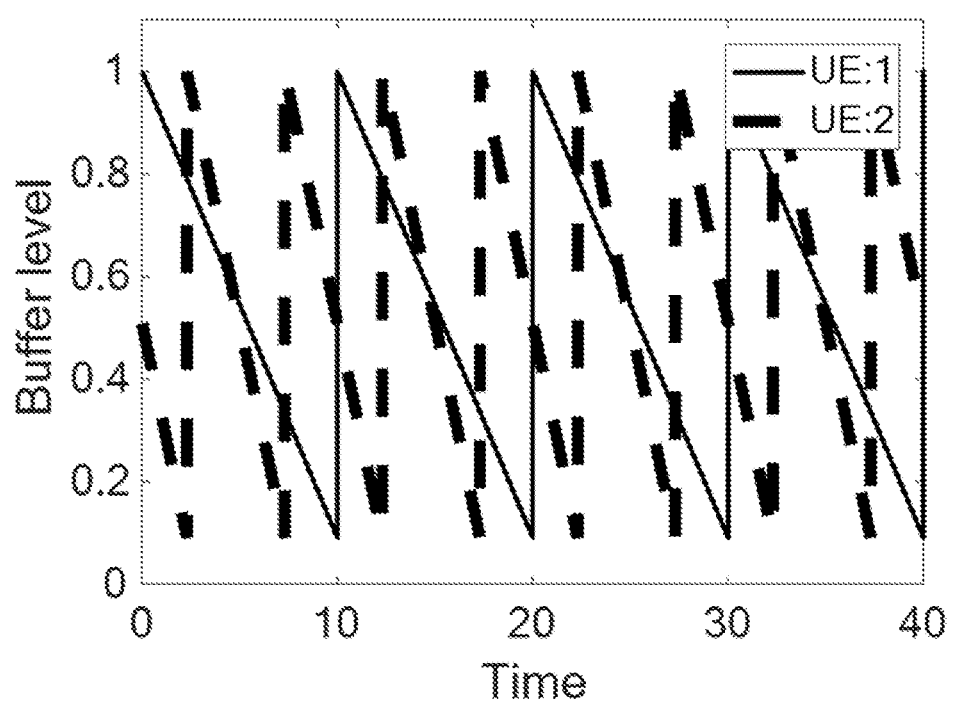
FIG. 2 is a schematic diagram illustrating prior art.

FIG. 2 depicts a schematic image of the percentage of data left in the playout buffer for two UEs, UE1 and UE2, in the network streaming video, where either the buffer size or the bitrate of the content differs from the two users.

To exemplify this, consider FIG. 1 and FIG. 2, which are schematic images of the percentage of data left in the playout buffer for two users in the network that are streaming video.

FIG. 1 may illustrate a scenario where the two UEs 1 and 2 have equal buffer sizes and they are further streaming data of the same quality (bitrate). The video streaming may for example have started at different time instances, and hence the data requests to fill up the buffer happen at separate times.

FIG. 2 may illustrate a scenario where the two UEs 1 and 2 have equal buffer sizes but UE2 have a twice as high quality of the stream (bitrate) than that of UE1. The video streaming has further started at different time instances, and hence the data requests to fill up the buffer happen at separate times.

As noted in both these examples, the data transmission in the network happens at separate times and these two high-data demanding UEs 1 and 2 are not being co-scheduled.

An object of embodiments herein is to improve the performance in a wireless communications network using two or more simultaneous data transmissions.

Example of embodiments herein relates to methods for optimizing multiple UE transmissions.

Example of embodiments herein provide delaying non-critical data transmissions, like video streaming or large data file transfers, in order to pair up more transmissions and increase the level of spatially multiplexed users. This may in case of video streaming be performed by utilizing a predictive manner of data-requests from high data demanding UE's, such as those using non-real-time video streaming and aligning these to increase the spatial multiplexing and hence utilize the network resources in a more efficient way.

The methods outlined herein work well in combination with for example the above mentioned scheduling algorithm that tries to accomplish similar gains but on a much smaller time scale. Aligning the most consuming data transmissions would decrease the overall amount of transmission, hence decrease the heat generation and in turn the occurrences where the above mentioned scheduling algorithm needs to kick in. In larger scale, the utilization of the method listed herein may decrease the size of the heat sinking fins needed and hence allow for smaller and cheaper products.

Figure 3:
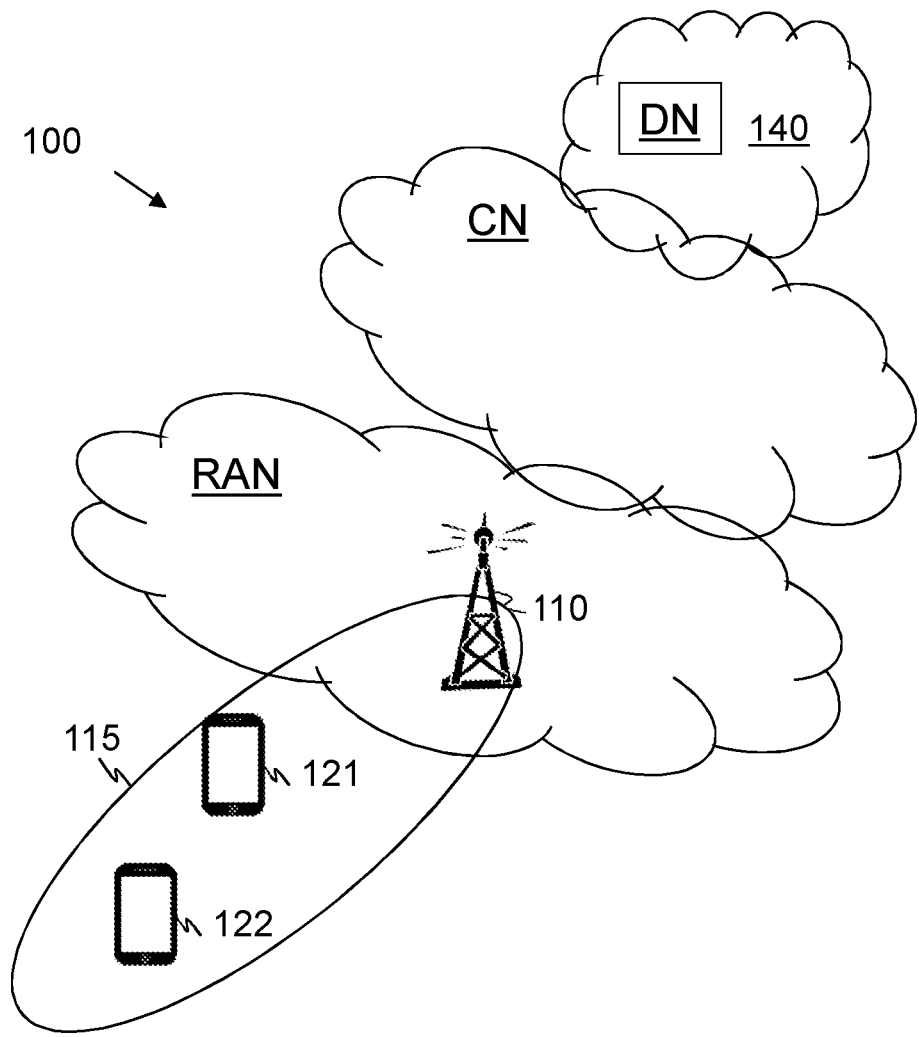
FIG. 3 is a schematic block diagram depicting embodiments of a wireless communication network.

An advantage of embodiments herein is that an increased number of spatially multiplexed users allows for more efficient use of the resources which may:
  Create more idle time which decreases the energy consumption,
  decrease the overall interference in the network,
  decrease the heat generated in products which in turn could be utilized to create smaller and cost-efficient products, and/or FIG. 3 is a schematic overview depicting a wireless communications network 100 wherein embodiments herein may be implemented. The wireless communications network 100 comprises one or more RANs and one or more CNs. The wireless communications network 100 may use 5

Fifth Generation New Radio, (5G NR) but may further use a number of other different Radio Access Technologies (RAT)s, such as, W-Fi, (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. According to some embodiments herein, a first RAT may e.g. be any one out of LTE or NR. A second RAT may e.g. be LTE if the first RAT is NR or NR if the first RAT is LTE.

Network nodes such as a network node 110 operate in the wireless communications network 100. The network node 110 provides radio access in one or more cells, such as e.g. a cell 115. This means that the network node 110 provides radio coverage over a geographical area by means of its antenna beams. The network node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with UEs within the cell served by network node 110 depending e.g. on the radio access technology and terminology used.

Wireless devices such as a first UE 121 and a second UE 122 operate in the wireless communications network 100. The first UE 121 and a second UE 122 may each be e.g. an NR device, a mobile station, a wireless terminal, an NB-IoT device, an eMTC device, a CAT-M device, a WiFi device, an LTE device and an a non-access point (non-AP) STA, a STA, that communicates via a base station such as e.g. the network node 110, one or more RANs to one or more CNs. It should be understood by the skilled in the art that the respective first UE 121 and a second UE 122 may relate to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

Methods herein may be performed by the network node 110. As an alternative, a Distributed Node (DN) and functionality, e.g. comprised in a cloud 140 as shown in FIG. 1a, may be used for performing or partly performing the methods.

FIG. 4 shows example embodiments of a method performed by the network node 110 for handling data transmissions to two or more UEs in the wireless communications network 100. The two or more UEs may comprise at least the first UE 121 and the second UE 122.

The method comprises one or more of the following actions, which actions may be taken in any suitable order. Actions that are optional are marked with dashed boxes in the figure.

Action 401

The network node 110 need to find UEs that are suitable for simultaneous data transmissions according to embodiments herein. According to embodiments herein the first and second UEs 121, 122 are suitable for simultaneous data transmissions. Thus, the network node 110 decides that the first UE 121 and the second UE 122 are compatible for simultaneous data transmissions. UEs Compatible for simultaneous data transmissions such as the first and second UEs 121, 122 may e.g. be UEs that are MU-MIMO suitable and share the same Scheduling Resources such as e.g. located in the same cell. It may further be UEs with a high data demand, and/or where the data requests may be predictive.

Compatible for simultaneous data transmissions may e.g. comprise, i.e. be represented by, compatible for any one out of spatial multiplexing, or Frequency Division Multiplexing (FDM).

Action 402

In some embodiments, the network node 110 determines that each of the first UE 121 and the second UE 122 has predictive requirement for data. This may be to get to know if future data transmission will happen and by this understand if it is possible adjust the transmissions to the first UE 121 and/or the second UE 122 such that future transmissions will happen at the same time, such that we get more MU-MIMO. In some embodiments, the "predictive requirement for data", may further comprise QoS requirements such as delay bounds. In some embodiments, a further reason for determining these is to set the limits for the timing. For example, the data may not be delayed longer than the delay bound.

Action 403

When decided that data transmissions of the UEs such as the first and second UEs 121, 122, are compatible for simultaneous data transmissions, the network node 110 will take the opportunity to make simultaneous transmissions in a common, also referred to as same, time resource to the first and second UEs 121, 122. This means that they will be timed. This and below features will be explained and exemplified more in detail below.

The network node 110 times the data transmissions to the first UE 121 and the second UE 122 in a common time resource. This is for simultaneous data transmissions comprising a first data transmission to the first UE 121 and a second data transmission the second UE 122. This means that the first data transmission to the first UE 121 and the second data transmission the second UE 122 are transmitted at the same time. The first UE 121 and the second UE 122 may use any one out of: The same frequency resources, or different frequency resources. This means that the first UE 121 and the second UE 122 uses the same, i.e. common, time resources, but may use the same frequency resources, or different frequency resources.

The timing of the data transmissions to the first UE 121 and the second UE 122 in the common time resource may be performed after the determining that each of the first UE 121 and the second UE 122 has predictive requirement for data.

The timing of the data transmission to the first UE 121 and the second UE 122 in the common time resource may e.g. be performed by intentionally time adjusting data scheduled for the first transmission to the first UE 121 to align with the second transmission to the second UE 122.

The intentionally time adjusting the data scheduled for the first transmission to the first UE 121 to align with the second transmission to the second UE 122 may be performed such that the predictive requirement for data is fulfilled.

In some embodiments, the intentionally time adjusting the data scheduled for the first transmission to the first UE 121 to align with the second transmission to the second UE 122, may be performed by any one out of:

Intentionally delaying the data scheduled for the first transmission to the first UE 121 to align with the second transmission to the second UE 122, or intentionally advancing the data scheduled for the first transmission to the first UE 121 to align with the second transmission to the second UE 122.

In some embodiments, the intentionally timing of the data transmission to the first UE 121 and the second UE 122 in a common time resource, may be performed by controlling any one or more out of:
- a first source of data of the first data transmission to the first UE 121 and a second source of data of the second data transmission, data server, e.g. a DASH-Aware Network Element (DANE) server and
- a first buffer of data of the first data transmission to the first UE 121 and a second buffer of data of the second data transmission. E.g. a buffer of a second network node such as e.g. Packet data network Gateway (PGW)/ User Datagram Protocol (UDP) or Central Unit (CU).

The embodiments described above will now be further explained and exemplified. The example embodiments described below may be combined with any suitable embodiment above.

An object of embodiments herein is to increase the amount of MU-MIMO scheduling occasions in the wireless communication system 100, such as LTE (4G), LTE-A, and/or NR (5G). Thus, enable that MU capable and MU suitable UEs, such as the first UE 121 and the second UE 122, have data simultaneous in their respective network node buffer, such as e.g. base-station (eNB, gNB) Transmission (Tx) buffer, e.g. MAC buffer(s).

This May e.g. Be Achieved by:
- The network node 110 may decide that the first UE 121 and the second UE 122 are compatible for simultaneous data transmissions by e.g. identifying and grouping potential UEs e.g. the first and second UEs 121, 122, in MU-MIMO Tx groups. The grouping may be performed such that each group comprises UEs that are MU-MIMO suitable and share the same Scheduling Resources, e.g. are located in the same cell such as e.g. cell 115. The grouping may further be performed for UEs with a high data demand, and/or where the data requests may be predictive. This relate to Action 401 above.
- One metric that may be used in some embodiments, for determining compatible UEs, e.g. the first and second UEs 121, 122, are the orthogonality of the channels to each UE. Such information may be retrieved from earlier transmission instances to each of the UE. Another metric to use is the relative path strengths of the UEs e.g. the first and second UEs 121, 122, to ensure that enough power is available to transmit to the users simultaneously.
- Other methods, if for example analogue beamforming gNBs which may be an embodiments of the network node 110, are considered, or codebook based transmissions, is to group UE's, e.g. the first and second UEs 121, 122, such that each UE in a group prefers a different beam to be used in data transmissions. In case of codebook based transmissions with oversampled codebooks there may further be required that the preferred beams between all UE's e.g. the first and second UEs 121, 122, in a group are orthogonal to ensure spatial compatibility.

A further metric is a measure of the time-criticalness of the data to the UEs such as the first and second UEs 121, 122. It has been seen that the response time from when a UE requests data to when data starts arriving is critical for user satisfaction. When the first set of data has been received, like the initial buffer of a streaming file or the first part of a web page, the remaining data is less time critical. This information may be used to allow for how long data can be halted at the base station before needing to be transmitted to the UE such as the first or second UE 121, 122.

In some embodiments the timing of the data transmission to the first UE 121 and the second UE 122 in a same time resource, are performed by controlling a source of data or a buffer of data.

E.g. a first source of data of the first data transmission to the first UE 121 and a second source of data of the second data transmission, e.g. in a data server, such as e.g. a DANE server, or
- a first buffer of data of the first data transmission to the first UE 121 and a second buffer of data of the second data transmission. This may be buffers of a second network node, e.g. in a PGW and/or a UDP or CU. This relate to Action 403 above.

Figure 5:
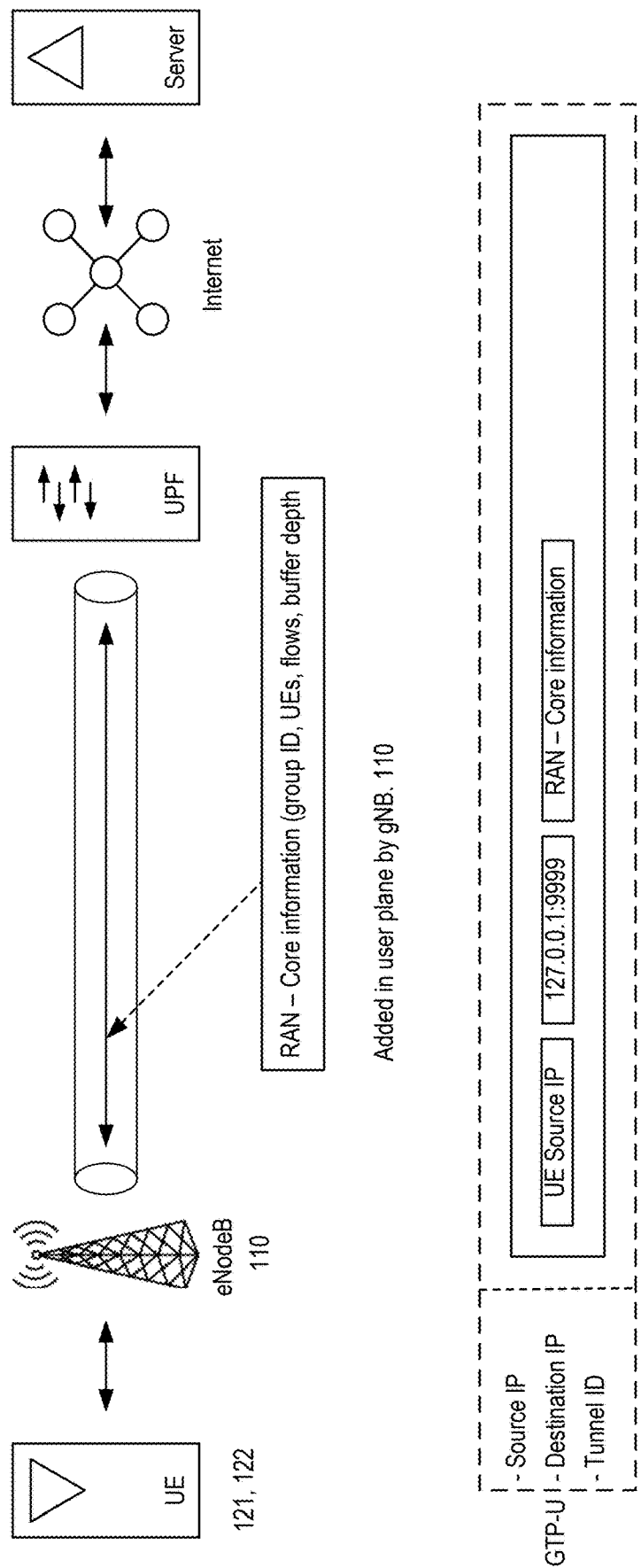
FIG. 5 is a schematic block diagram depicting an example embodiment.

In an example of these embodiments, the MU-MIMO group(s) information, e.g. information about a group comprising e.g. the first and second UEs 121, 122, may be sent to an entity that can control the data source, or the network scheduler.
- As one example useful for aligning video streaming, the MU-MIMO groups are sent to a data server such as DANE server.
- Another example is that the information is sent to the data scheduler of the network node 110 together with information of the UE's such as e.g. the first and second UEs' 121, 122, play-out buffer size to allow for intentional delaying of data or pre-scheduling of data to increase the multiplexing ratio.
- Another example is that the RAN information is given to a core network node, e.g. a PGW and/or a User Plane Function (UPF), that will buffer data of the identified compatible UEs such as e.g. the first and second UEs 121, 122, to achieve data being made available to the network node 110 for achieving MU-MIMO scheduling. The information transfer between RAN network and Core network may be done by adding information fields to e.g. the General packet radio services Tunneling Protocol (GTP). See FIG. 5. GTP-U means GTP-User plane (U) . . . and is used for carrying user data within a GPRS core network and between a radio access network and the core network.

If assuming that controlling of the data through for example the core network node e.g. the PGW/UPF, the following flow may be considered:
- The RAN such as the network node 110 conveys which UEs e.g. the first and second UEs 121, 122, and/or flows that are compatible for simultaneous data transmissions, e.g. grouped to the same MU-MIMO Tx group. The GTP-U protocol or other protocol messages may be carriers of the information between the RAN such as the the network node 110, and the Core Network.
- The core network node, also referred to as second network node, e.g. the PGW/UPF, buffers data for the UEs such as e.g. the first and second UEs 121, 122, belonging to the same MU-MIMO Tx group and pace it out in order to make it available for the RAN and the gNB such as the network node 110 to utilize MU-MIMO scheduling for timing the transmissions.
- The RAN such as the network node 110 may further transfer indications to the PGW/UPF of the about of buffer depth needed in order to increase the efficiency of the MU-MIMO scheduling for the given group of UEs such as e.g. the first and second UEs 121, 122, and/or their data flows.

If assuming that controlling of the data through a data server, for example the DANE, the following flow may be considered.

The data server, e.g. the DANE calculates the request times for each member e.g. the first and second UEs 121, 122, in a MU-MIMO group. The request time is when the DASH client shall send a new segment request to the media server. The request time is sent from the DANE to the DASH client within the message NetworkAssistanceResponse.

The request time(s) may be based on the group members' information in the "NetworkAssistanceRequest", such as play-out buffer levels, segment duration, and bandwidth operation points, e.g. video bitrates, along with Round-Trip Time (RTT) estimations, e.g. when data will be available at the scheduler of the network node 110. The request time may be given as wall-clock time.

The DASH clients may send their segment request based on the response from the DANE server. Thus, increasing the likelihood for occasions to schedule simultaneous data transmissions, such as e.g. for MU-MIMO scheduling occasions.

Then the network node 110 such as the scheduler of the network node 110 such as the MU-MIMO enabled scheduler, may further time the data transmissions to the first UE 121 and the second UE 122 in a common time resource e.g. aligning the MU-MIMO UEs, by delaying the transmission of the first data transmission of the first UE 121 such that its transmission time coincides with the second data transmission of the second UE 122. E.g. delaying the Tx occasion for some UEs.

The scheduler must not delay the occasion for UEs too much in order to not false trigger re-transmission at the Transmission Control Protocol (TCP) and Radio Link Control (RLC) layers.

A result of the benefit of utilizing embodiments herein described above is illustrated in the below text and figures.

In some first embodiments, consider the scenario depicted in the background FIG. 1, where two UEs exist in the network and have the same playout-buffer size and are streaming data of similar quality. The two UEs have started their video streaming at two separate occasions.

Figure 6:
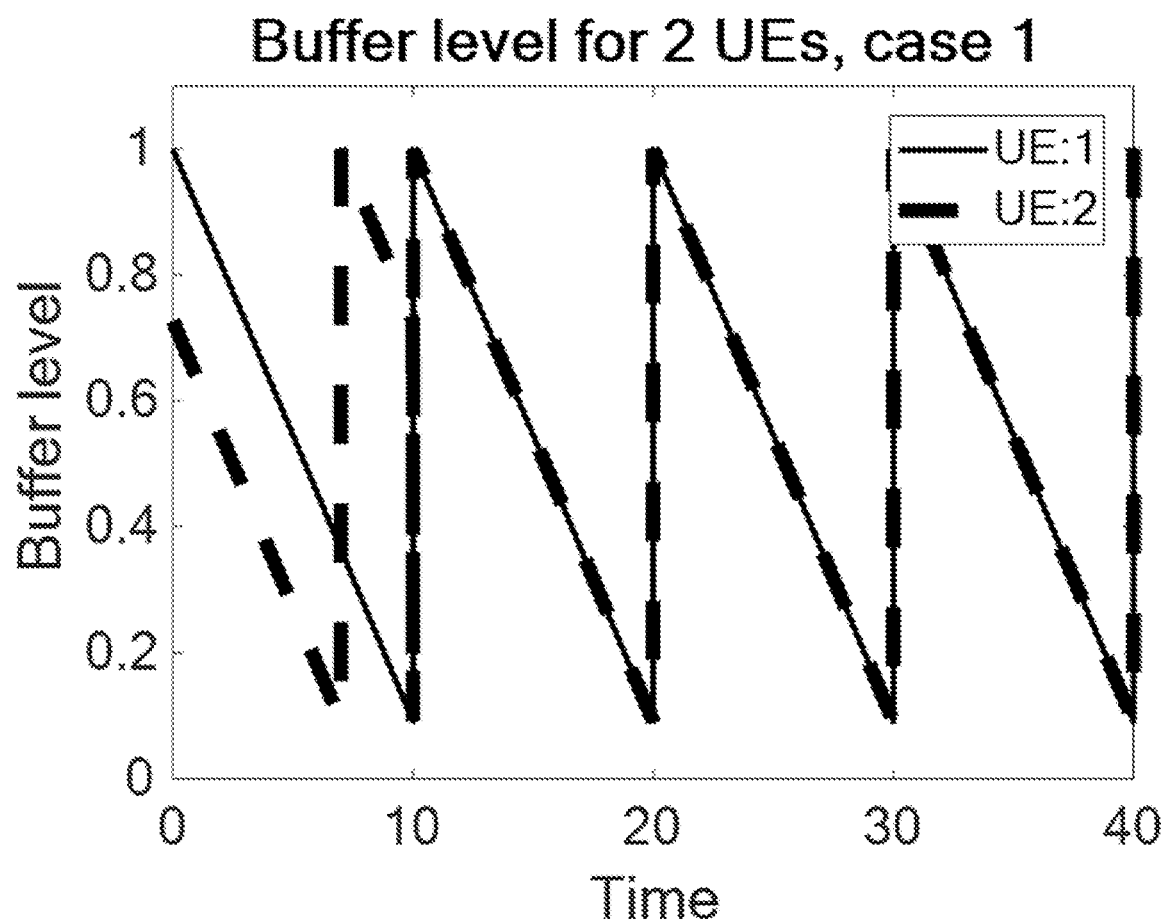
FIG. 6 is a schematic diagram illustrating an example embodiment.

Now see FIG. 6 illustrating a scenario when embodiments herein are used, to be compared to FIG. 1. At time instance ~8 it is detected that the two UEs here the first and second UEs 121, 122, denoted UE1 and UE2 in FIG. 6, have high data demanding streaming services and that they are spatially compatible. I.e. the network node 110 decides that a first UE 121 and the second UE 122 are compatible for simultaneous data transmissions.

Hence, when the next data request comes from the first UE 121, i.e. UE 1, the network node 110 takes the opportunity to make a simultaneous transmission to the second UE 122, i.e. UE 2, to refill its playout buffer and by this aligning all further data requests and buffer fill-ups. This results in all further transmissions to be timed, also referred to as aligned. This results in that only half of the transmission times, which means half of the network node 110 resources, are needed to serve both e.g. the first UE 121 and the second UE 122.

In some second embodiments, consider the scenario depicted in the background FIG. 2, where two UEs exist in the network and have the same playout-buffer size but the quality of UE2 is twice as high as that for UE1. Hence require twice the data transmission times to maintain the video application. The two UEs, have started their video streaming at two separate occasions.

Figure 7:
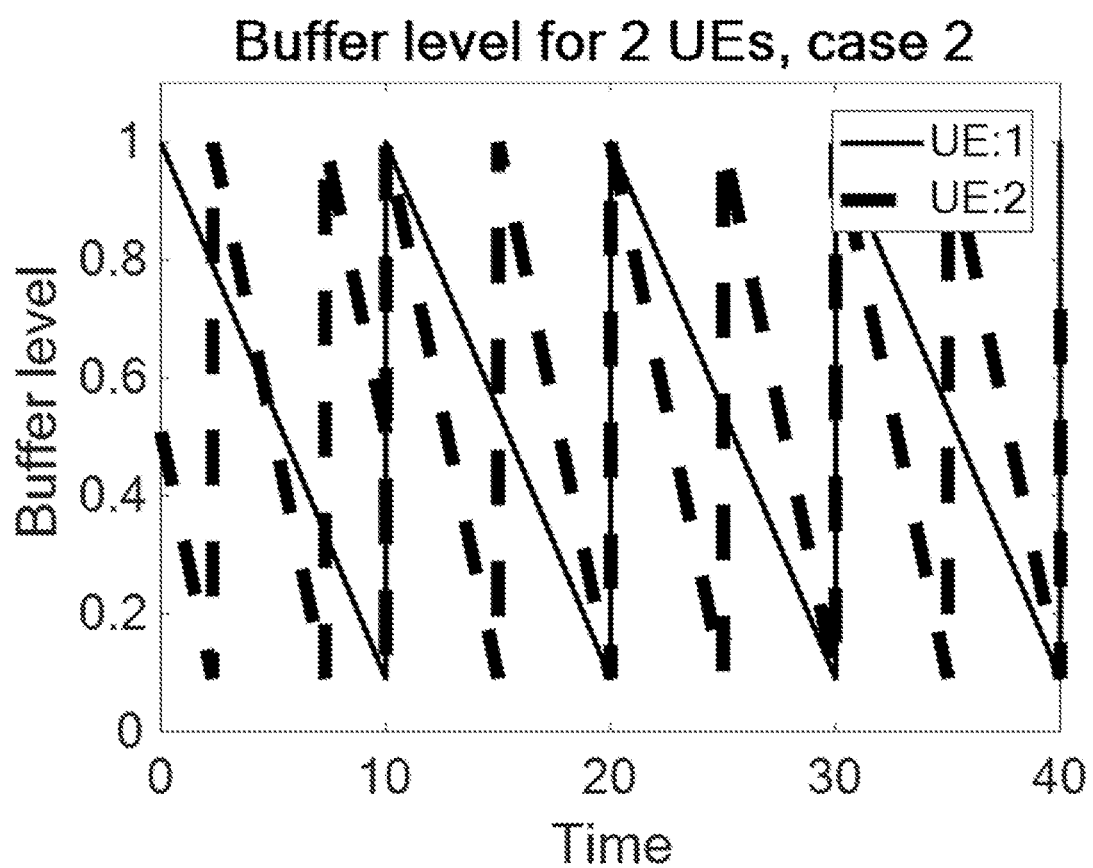
FIG. 7 is a schematic diagram illustrating an example embodiment.

Now see FIG. 7 illustrating a scenario when embodiments herein are used, to be compared to FIG. 2. At time instance ~8 it is detected that the two UEs e.g. the first and second UEs 121, 122, (UE1, UE2) have high data demanding streaming services and that they are spatially compatible. I.e. the network node 110 decides that a first UE 121 and the second UE 122 are compatible for simultaneous data transmissions.

Hence, when the next data request comes from the first UE 121, i.e. UE 1, the network node 110 takes the opportunity to make a simultaneous transmission to the second UE 122, i.e. UE 2, to refill its playout buffer and by this aligning some of the further data requests and buffer fill-ups. As the network node 110 is aware of that the bitrate of UE2 service is twice as high as the service of UE1, it does not fill up the playout buffer of UE1 for each instance of transmission to UE2 but only utilizes every other transmission instance. This results in all further transmissions to the first UE 121, i.e. UE 1 being timed, also referred to as aligned, by half of the transmissions to the second UE 122, i.e. UE 2, hence saving 33% of the overall transmission instances while still serving both the first UE 121 and the second UEs 121.

Figure 8A:
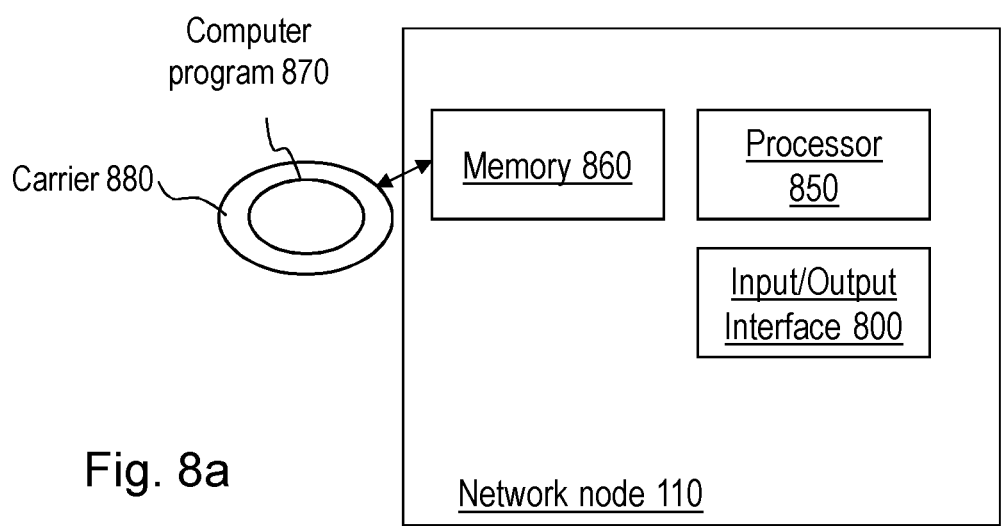
FIGS. 8a and b are schematic block diagrams depicting embodiments of a network node.
Figure 8B:
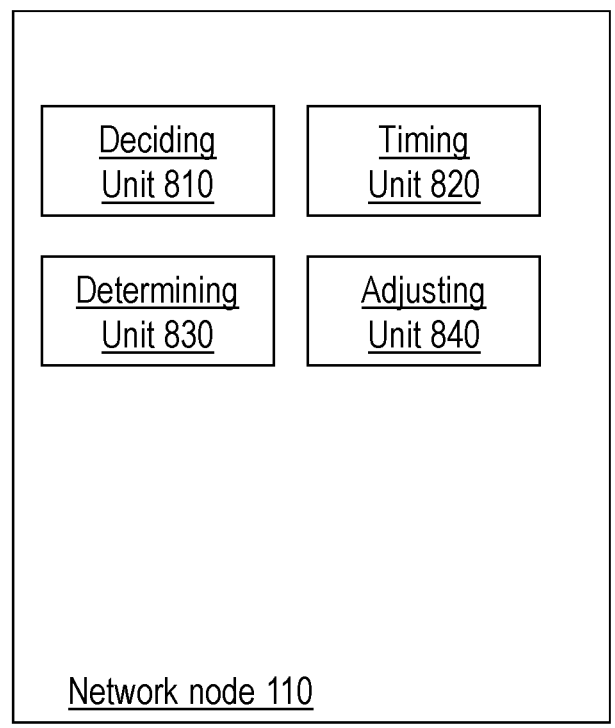

To perform the action as mentioned above, the network node 110 may comprise the arrangement as shown in FIGS. 8*a* and *b*. The network node 110 is configured to handle data transmissions to two or more User Equipments, UEs, in a wireless communications network 100. In some embodiments two or more UEs are adapted to comprise at least the first UE 121 and the second UE 122.

The network node 110 may comprise an input and output interface 800 configured to communicate with the first and second UEs 121, 122, see FIG. 8*a*. The input and output interface 800 may comprise a wireless receiver (not shown) and a wireless transmitter (not shown).

The network node 110 is further configured to, e.g. by means of a deciding unit 810 in the network node 110, decide that a first UE 121 and a second UE 122 are compatible for simultaneous data transmissions.

In some embodiments the network node 110 the first UE 121 and the second UE 122 are adapted to use any one out of: the same frequency resources, or different frequency resources.

In some embodiments, the compatible for simultaneous data transmissions is adapted to comprise compatible for any one out of: spatial multiplexing, or Frequency Division Multiplexing, FDM.

The network node 110 is further configured to, e.g. by means of a timing unit 820 in the network node 110, time the data transmissions to the first UE 121 and the second UE 122 in a common time resource, for simultaneous data transmissions. The data transmissions comprise a first data transmission to the first UE 121 and a second data transmission the second UE 122.

In some embodiments the network node 110 may further be configured to time e.g. by means of the timing unit 820 in the network node 110, the data transmissions to the first UE 121 and the second UE 122 in a common time resource.

The data transmissions may be timed after determining, e.g. by means of a determining unit 830, that each of the first UE 121 and the second UE 122 has predictive requirement for data.

In some embodiments the network node 110 may further be configured to time e.g. by means of the timing unit 820 in the network node 110, the data transmissions to the first UE 121 and the second UE 122 in a same time resource. The network node 110 may further be configured to perform the timing, e.g. by means of an adjusting unit 840, by further intentionally time adjust data scheduled for the first transmission to the first UE 121 to align with the second transmission to the second UE 122.

In some embodiments the network node 110 may further be configured to e.g. by means of the adjusting unit 840, intentionally time adjust the data scheduled for the first transmission to the first UE 121 to align with the second transmission to the second UE 122 such that the predictive requirement for data is fulfilled.

In some embodiments the network node 110 may further be configured e.g. by means of the adjusting unit 840, to intentionally time adjust the data scheduled for the first transmission to the first UE 121 to align with the second transmission to the second UE 122, by any one out of
  intentionally delaying the data scheduled for the first transmission to the first UE 121 to align with the second transmission to the second UE 122, or
  intentionally advancing the data scheduled for the first transmission to the first UE 121 to align with the second transmission to the second UE 122.

In some embodiments the network node 110 may further be configured to, e.g. by means of the timing unit 820, intentionally time the data transmission to the first UE 121 and the second UE 122 in a same time resource, by controlling any one or more out of:
  a first source of data of the first data transmission to the first UE 121 and a second source of data of the second data transmission, and
  a first buffer of data of the first data transmission to the first UE 121 and a second buffer of data of the second data transmission.

The embodiments herein may be implemented through a processor or one or more processors, such as a processor 850 of a processing circuitry in the network node 110, depicted in FIGS. 8*a* and *b*, together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a respective memory 860 comprising one or more memory units. Each memory 860 comprises instructions executable by the processor 850 in the network node 110.

The memory 860 is arranged to be used to store orders, requirements, information, data, configurations, and applications to perform the methods herein when being executed in the network node 110.

In some embodiments, a computer program 870 comprises instructions, which when executed by the at least one processor 850, cause the at least one processor 850 of the network node 110 to perform the actions above.

In some embodiments, a respective carrier 880 comprises the respective computer program 870, wherein the carrier 880 is one of an electronic signal, an optical signal, an electromagnetic signal, a magnetic signal, an electric signal, a radio signal, a microwave signal, or a computer-readable storage medium.

Those skilled in the art will also appreciate that the units in the units described above may refer to a combination of analog and digital circuits, and/or one or more processors configured with software and/or firmware, e.g. stored in the network node 110, that when executed by the respective one or more processors such as the processors or processor circuitry described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Further Extensions and Variations

Figure 9:
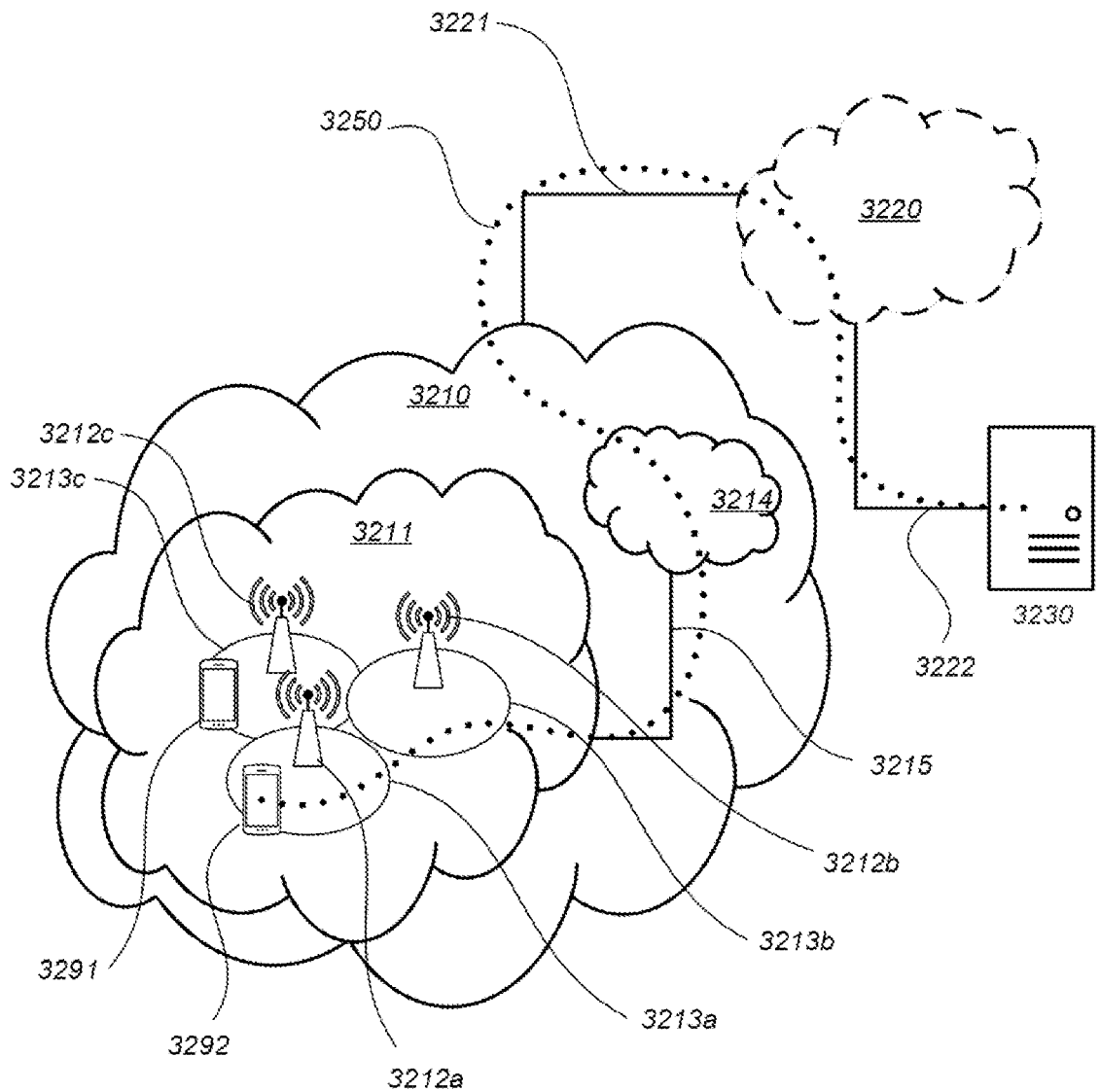
FIG. 9 schematically illustrates a telecommunication network connected via an intermediate network to a host computer.

With reference to FIG. 9, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212*a*, 3212*b*, 3212*c*, such as the network node 110, access nodes, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) e.g. the UE 121, 122 such as a Non-AP STA 3291 located in coverage area 3213*c* is configured to wirelessly connect to, or be paged by, the corresponding base station 3212*c*. A second UE 3292 e.g. the wireless device 122 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 10:
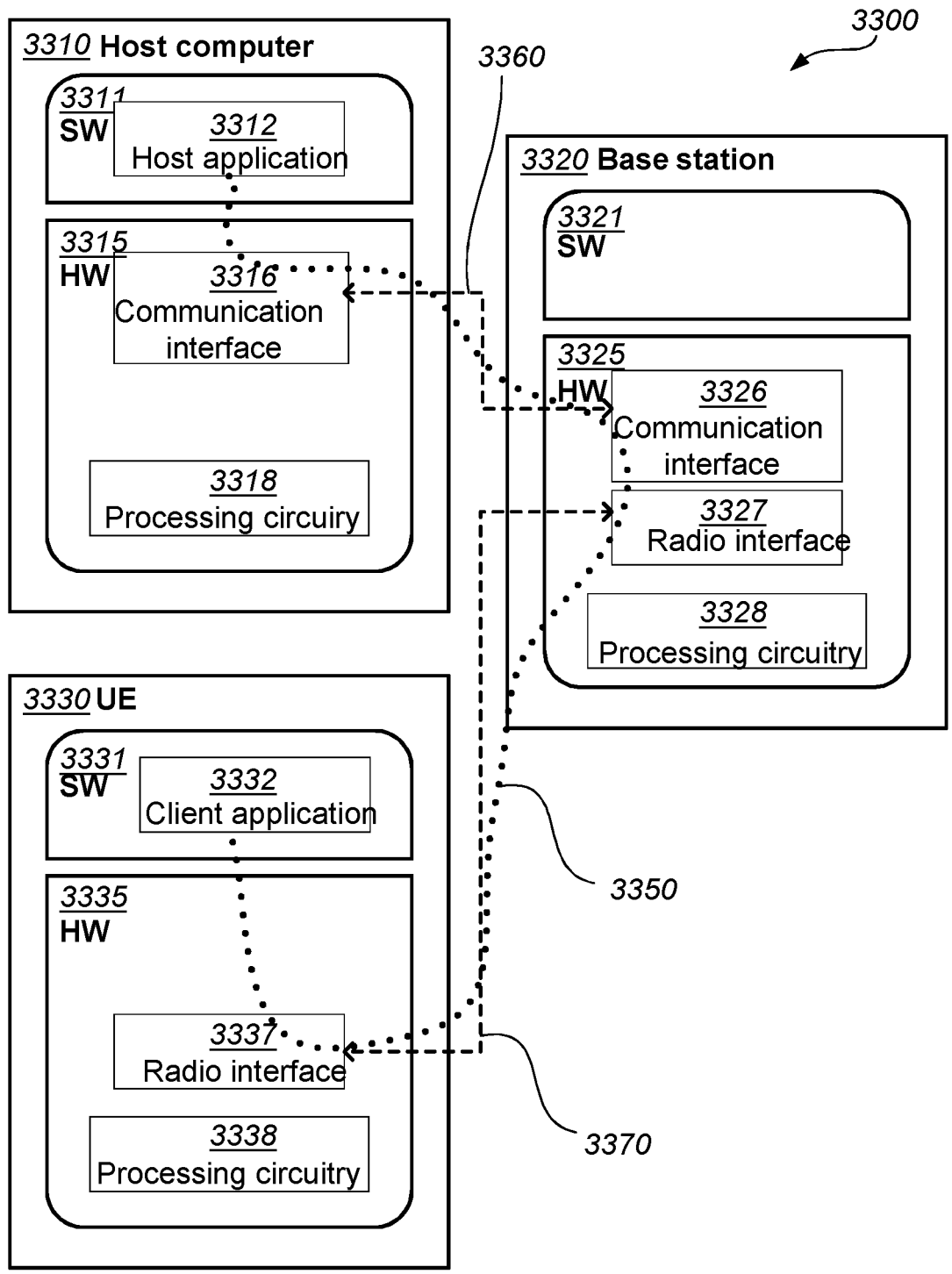
FIG. 10 is a generalized block diagram of a host computer communicating via a base station with a user equipment over a partially wireless connection.

It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 11, respectively. This is to say, the inner workings of these entities may be as shown in FIG. 10 and independently, the surrounding network topology may be that of FIG. 9.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 11 is a flowchart illustrating a method implemented in a communication system, in accordance with one embodiment. The communication system includes a host computer, a base station such as the network node 110, and a UE such as the UE 121, 122, which may be those described with reference to FIG. 9 and FIG. 10. For simplicity of the present disclosure, only drawing references to FIG. 11 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 12 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 13 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station such as an AP STA, and a UE such as a Non-AP STA which may be those described with reference to FIG. 9 and FIG. 10. For simplicity of the present disclosure, only drawing references to FIG. 14 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

The invention claimed is:

1. A method performed by a radio network node for handling data transmissions to two or more User Equipments, UEs, in a wireless communications network, the method comprising:
    deciding that a first UE and a second UE are compatible for simultaneous data transmissions,
    timing the data transmissions to the first UE and the second UE in a common time resource, for simultaneous data transmissions comprising a first data transmission to the first UE and a second data transmission to the second UE, and
    wherein the timing of the data transmission to the first UE and the second UE in the common time resource, is performed by intentionally time adjusting data scheduled for the first transmission to the first UE to align with the second transmission to the second UE.

2. The method according to claim 1, wherein the timing of the data transmissions to the first UE and the second UE in the common time resource are performed after determining that each of the first UE and the second UE has a predictive requirement for data.

3. The method according to claim 1, wherein intentionally time adjusting the data scheduled for the first transmission to the first UE to align with the second transmission to the second UE is performed such that the predictive requirement for data is fulfilled.

4. The method according to claim 1, wherein the intentionally time adjusting the data scheduled for the first transmission to the first UE to align with the second transmission to the second UE, is performed by any one out of
    intentionally delaying the data scheduled for the first transmission to the first UE to align with the second transmission to the second UE, or
    intentionally advancing the data scheduled for the first transmission to the first UE to align with the second transmission to the second UE.

5. The method according to claim 1, wherein the first UE and the second UE are using any one out of: the same frequency resources, or different frequency resources.

6. The method according to claim 1, wherein the two or more UEs comprise at least the first UE and the second UE.

7. The method according to claim 1, wherein compatibility for simultaneous data transmissions comprises compatibility for any one out of: spatial multiplexing, or Frequency Division Multiplexing, FDM.

8. A radio network node configured to handle data transmissions to two or more User Equipments, UEs, in a wireless communications network, the radio network node further being configured to:
  decide that a first UE and a second UE are compatible for simultaneous data transmissions,
  time the data transmissions to the first UE and the second UE in a common time resource, for simultaneous data transmissions comprising a first data transmission to the first UE and a second data transmission to the second UE, and
  wherein the timing of the data transmission to the first UE and the second UE in the common time resource, is performed by intentionally time adjusting data scheduled for the first transmission to the first UE to align with the second transmission to the second UE.

9. The radio network node according to claim 8, further being configured to time the data transmissions to the first UE and the second UE in the common time resource, after determining that each of the first UE and the second UE has a predictive requirement for data.

10. The radio network node according to claim 8, further being configured to intentionally time adjust the data scheduled for the first transmission to the first UE to align with the second transmission to the second UE such that the predictive requirement for data is fulfilled.

11. The radio network node according to claim 8, further being configured to intentionally time adjust the data scheduled for the first transmission to the first UE to align with the second transmission to the second UE, by any one out of
  intentionally delaying the data scheduled for the first transmission to the first UE to align with the second transmission to the second UE, or
  intentionally advancing the data scheduled for the first transmission to the first UE to align with the second transmission to the second UE.

12. The radio network node according to claim 8, wherein the first UE and the second UE are adapted to use any one out of: the same frequency resources, or different frequency resources.

13. The radio network node according to claim 8, wherein the two or more UEs are adapted to comprise at least the first UE and the second UE.

14. The radio network node according to claim 8, wherein compatibility for simultaneous data transmissions is adapted to comprise compatibility for any one out of: spatial multiplexing, or Frequency Division Multiplexing, FDM.

* * * * *